(12) United States Patent
Subramanian et al.

(10) Patent No.: US 12,056,251 B2
(45) Date of Patent: Aug. 6, 2024

(54) SYSTEMS AND METHODS FOR PROTECTING A FOLDER FROM UNAUTHORIZED FILE MODIFICATION

(71) Applicant: Veritas Technologies LLC, Santa Clara, CA (US)

(72) Inventors: Narayan Subramanian, Pune (IN); Arindam Panna, Pune (IN); Srineet Sridharan, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 73 days.

(21) Appl. No.: 16/822,821

(22) Filed: Mar. 18, 2020

(65) Prior Publication Data

US 2021/0294910 A1 Sep. 23, 2021

(51) Int. Cl.
*G06F 21/62* (2013.01)
*G06F 16/176* (2019.01)
(Continued)

(52) U.S. Cl.
CPC ...... *G06F 21/6209* (2013.01); *G06F 16/1774* (2019.01); *H04L 9/3242* (2013.01);
(Continued)

(58) Field of Classification Search
CPC .. G06F 21/6209; G06F 21/6218; G06F 21/31; G06F 16/1774; G06F 21/62; G06F 21/6281; G06F 21/32; G06F 21/54; G06F 21/552; G06F 21/568; G06F 21/554; G06F 21/602; G06F 21/10; G06F 16/188;
(Continued)

(56) References Cited

U.S. PATENT DOCUMENTS 5,860,153 A * 1/1999 Matena ................ H04L 61/00
711/E12.027
10,007,795 B1 * 6/2018 Chung ................ G06F 21/568
(Continued)

FOREIGN PATENT DOCUMENTS

CN 1606010 A * 4/2005 ........... G06F 16/125
CN 101112035 A * 1/2008 ............... H04L 9/08
(Continued)

OTHER PUBLICATIONS

A Selective Encryption Approach to Fine-Grained Access Control for P2P File Sharing by Aditi Gupta, Salmin Sultana, Michael Kirkpatrick and Elisa Bertino pp. 10; Date of Conference: Oct. 9-12, 2010.*
(Continued)

*Primary Examiner* — Eleni A Shiferaw
*Assistant Examiner* — Ali H. Cheema
(74) *Attorney, Agent, or Firm* — Greenberg Traurig, LLP

(57) ABSTRACT

A method for protecting a folder from unauthorized file modification may include receiving, from a remote device, a modify request for a target file in a folder and determining whether the folder is a protected folder. The method may also include determining, in response to determining the folder is the protected folder, whether the remote device is a trusted host. The method may further include allowing, in response to determining that the remote device is the trusted host, the modify request for the target file.

16 Claims, 5 Drawing Sheets

(51) Int. Cl.
*H04L 9/32* (2006.01)
*G06F 21/44* (2013.01)
*G06F 21/64* (2013.01)

(52) U.S. Cl.
CPC .......... *G06F 21/44* (2013.01); *G06F 21/6218* (2013.01); *G06F 21/64* (2013.01)

(58) Field of Classification Search
CPC ......... H04L 9/3242; H04L 9/08; H04L 63/08; H04L 63/10; H04L 63/101; H04L 63/0227
USPC .................................. 726/28, 27, 1; 713/165
See application file for complete search history.

(56) References Cited

U.S. PATENT DOCUMENTS

| | | | |
|---|---|---|---|
| 10,122,752 B1* | 11/2018 | Soman | H04L 63/0227 |
| 10,181,948 B1* | 1/2019 | Nenov | G06F 8/65 |
| 10,503,905 B1* | 12/2019 | Misra | G06F 21/64 |
| 2003/0110397 A1 | 6/2003 | Supramaniam | |
| 2003/0140049 A1* | 7/2003 | Radatti | G06F 16/10 |
| 2003/0177194 A1* | 9/2003 | Crocker | G06F 21/6218 709/206 |
| 2007/0101079 A1* | 5/2007 | Macintyre | G06F 12/0804 711/E12.098 |
| 2007/0118735 A1* | 5/2007 | Cherrington | H04L 63/0428 713/155 |
| 2007/0250547 A1* | 10/2007 | Kai | G06F 21/552 |
| 2008/0022413 A1* | 1/2008 | Holtzman | G06F 21/6218 726/27 |
| 2010/0235649 A1* | 9/2010 | Jeffries | G06F 21/6209 726/28 |
| 2011/0061112 A1* | 3/2011 | Berengoltz | G06F 21/6218 726/30 |
| 2011/0162040 A1* | 6/2011 | Stephens | H04L 63/101 726/1 |
| 2011/0277013 A1* | 11/2011 | Chinta | G06F 21/54 726/1 |
| 2013/0145178 A1* | 6/2013 | Jeffries | G06F 21/6209 713/193 |
| 2013/0262395 A1* | 10/2013 | Levinshtein | G06F 16/16 707/674 |
| 2015/0278243 A1* | 10/2015 | Vincent | G06F 16/182 707/634 |
| 2015/0319147 A1* | 11/2015 | Lin | H04L 63/083 713/165 |
| 2015/0379286 A1* | 12/2015 | Nordback | H04L 9/0872 713/165 |
| 2016/0098204 A1* | 4/2016 | Bushman | G06F 3/0667 711/156 |
| 2017/0024133 A1* | 1/2017 | Bushman | G06F 3/0664 |
| 2017/0185790 A1* | 6/2017 | Gauda | G06F 21/6209 |
| 2017/0187527 A1* | 6/2017 | Gauda | H04L 9/0897 |
| 2017/0228390 A1* | 8/2017 | Oliveri | G06F 16/188 |
| 2017/0329677 A1* | 11/2017 | Crofton | H04L 67/1095 |
| 2018/0307855 A1* | 10/2018 | Dogu | G06F 21/6218 |
| 2018/0349223 A1* | 12/2018 | Dhuse | G06F 3/0652 |
| 2019/0356668 A1* | 11/2019 | Alcorn | H04L 9/3215 |
| 2019/0370013 A1* | 12/2019 | Katchapalayam | G06F 9/44 |
| 2020/0012803 A1 | 1/2020 | Mannan | |
| 2020/0110892 A1* | 4/2020 | Ramakrishnappa | G06F 21/78 |
| 2020/0302074 A1* | 9/2020 | Little | G06F 21/6218 |
| 2021/0012002 A1* | 1/2021 | Rosenthal | G06F 11/1448 |
| 2021/0117332 A1* | 4/2021 | Vajravel | G06F 12/0875 |
| 2021/0133316 A1* | 5/2021 | Vajravel | G06F 21/53 |
| 2021/0160284 A1* | 5/2021 | Strogov | H04L 63/101 |
| 2021/0209243 A1* | 7/2021 | Gallardo | G06F 16/188 |

FOREIGN PATENT DOCUMENTS

| | | | | |
|---|---|---|---|---|
| CN | 101452454 A | * | 6/2009 | |
| CN | 101925913 A | * | 12/2010 | ......... G06F 21/6218 |
| JP | 2007328400 A | * | 12/2007 | |
| JP | 2008085448 A | * | 4/2008 | |
| JP | 2020522808 A | * | 7/2020 | ......... G06F 21/554 |
| KR | 20170099351 A | * | 8/2017 | ......... G06F 16/188 |
| WO | WO-2011137743 A1 | * | 11/2011 | ......... G06F 21/602 |
| WO | WO-2018056601 A1 | * | 3/2018 | ............ G06F 21/10 |

OTHER PUBLICATIONS

An Approach for Data Storage Security in Cloud Computing by Deepanchakaravarthi Purushothaman and Dr.Sunitha Abburu pp. 6; IJCSI International Journal of Computer Science Issues, vol. 9, Issue 2, No. 1, Mar. 2012.*
"An approach for indexing file names in a directory" by "Ivaylo Atanassov" pp. 8; Published on: Jun. 22-23, 2012.*
Ivaylo Atanassov; (An approach for indexing file names in a directory); pp. 8; Published on Jun. 22-23, 2012.*
Communication Pursuant to Rules 161 (1) and 162 EPC received for European Application No. 21720044.3, mailed on Oct. 25, 2022; 3 pages.
Notice of Reasons for Refusal received for Japanese Application No. 2022-552835, mailed on Sep. 26, 2023, 3 pages.
International Search Report received for International Application No. PCT/US2021/022822, mailed Jun. 22, 2021; 3 pages.
Written Opinion received for International Application No. PCT/US2021/022822, mailed Jun. 22, 2021; 3 pages.

* cited by examiner

SYSTEMS AND METHODS FOR PROTECTING A FOLDER FROM UNAUTHORIZED FILE MODIFICATION

BACKGROUND

Backup applications often create backup images for backing up software environments, such as operating systems, files, applications, etc. Backup images may be used for restoring machines to stable states, updating machines, or for performing other maintenance functions. Backup images may be accessed from a centralized server or may be deployed locally, for instance stored in a local folder or shared folder. Remotely accessing backup images, for example an admin server accessing a backup image on a client machine, may provide flexibility. Legitimate processes, which may run on trusted hosts, may need to access the shared folder for updating the backup images or performing other maintenance operations.

However, allowing remote access to backup images may create security vulnerabilities. For example, ransomware software may access the folder containing backup images and encrypt the backup images for ransom. Other malware may access and corrupt the backup images. Although restricting access to the shared folder may prevent such security vulnerabilities, legitimate processes may be prevented from properly functioning. In addition to backup applications, other applications, such as archiving software, replication software, security software, etc., may also require protecting data from malware while permitting access to legitimate processes.

The present disclosure, therefore, identifies and addresses a need for systems and methods for protecting a folder from unauthorized file modification.

SUMMARY

As will be described in greater detail below, the present disclosure describes various systems and methods for protecting a folder from unauthorized file modification by receiving a modify request from a remote device for a target file in a folder, determining that the folder is a protected folder, determining that the remote device is a trusted host, and allowing the modify request for the target file.

In one embodiment, a method for protecting a folder from unauthorized file modification may include (i) receiving, from a remote device, a modify request for a target file in a folder, (ii) determining whether the folder is a protected folder, (iii) determining, in response to determining the folder is the protected folder, whether the remote device is a trusted host, and (iv) allowing, in response to determining that the remote device is the trusted host, the modify request for the target file.

In some examples, the remote device may send the modify request in response to (a) detecting the modify request from a process on the remote device, (b) determining whether the target file is in the protected folder, (c) determining, in response to determining that the target file is in the protected folder, whether the process is an authorized process, and (d) sending, in response to determining that the process is the authorized process, the modify request.

In some examples, determining whether the target file is in the protected folder may further include determining whether the folder includes a marker file, and determining, in response to determining the folder includes the marker file, that the folder is the protected folder.

In some examples, detecting the modify request may include intercepting, by a minifilter of the remote device, the modify request. In some examples, the modify request may include a network address of the remote device. In some examples, determining whether the remote device is the trusted host may be based on the network address. In some examples, the modify request may include a hash of a key maintained by a lockdown server and determining whether the remote device is the trusted host may be based on recognizing the hash.

In some examples, receiving the modify request may further include intercepting, by a minifilter, the modify request. In some examples, the minifilter may communicate with a lockdown server to determine whether the remote device is a trusted host. In some examples, determining whether the remote device is the trusted host may further include confirming, by contacting the remote device, the modify request. In some examples, the minifilter may communicate with a remote minifilter associated with the remote device to determine whether the remote device is the trusted host.

In one example, a system for protecting a folder from unauthorized file modification may include several modules stored in memory, including (i) a receive module, stored in memory, for receiving, from a remote device, a modify request for a target file in a folder, (ii) a folder module, stored in the memory, for determining whether the folder is a protected folder, (iii) a host validation module, stored in the memory, for determining, in response to determining the folder is the protected folder, whether the remote device is a trusted host, (iv) a modify module, stored in the memory, for allowing, in response to determining that the remote device is the trusted host, the modify request for the target file, and (v) at least one physical processor that executes the receive module, the folder module, the host validation module, and the modify module.

In some examples, the remote device may send the modify request in response to (a) detecting the modify request from a process on the remote device, (b) determining whether the target file is in the protected folder, (c) determining, in response to determining that the target file is in the protected folder, whether the process is an authorized process, and (d) sending, in response to determining that the process is the authorized process, the modify request.

In some examples, determining whether the target file is in the protected folder may further include determining whether the folder includes a marker file, and determining, in response to determining the folder includes the marker file, that the folder is the protected folder.

In some examples, detecting the modify request may include intercepting, by a minifilter of the remote device, the modify request. In some examples, the modify request may include a network address of the remote device. In some examples, determining whether the remote device is the trusted host may be based on the network address.

In some examples, the system may further include a minifilter. Receiving the modify request may further include intercepting, by the minifilter, the modify request. In some examples, the minifilter may communicate with a lockdown server to determine whether the remote device is the trusted host.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, from a remote device, a modify request for a target file in a folder, (ii) determine whether the folder is a protected folder, (iii) determine, in response to determining the folder is the protected folder, whether the remote device is a trusted host, and (iv) allow, in response to determining that the remote device is the trusted host, the modify request for the target file.

In some examples, the remote device may send the modify request in response to (a) detecting the modify request from a process on the remote device, (b) determining whether the target file is in the protected folder by determining whether the folder includes a marker file, (c) determining, in response to determining that the target file is in the protected folder, whether the process is an authorized process, and (d) sending, in response to determining that the process is the authorized process, the modify request.

In some examples, detecting the modify request may include intercepting, by a minifilter of the remote device, the modify request. In some examples, receiving the modify request may further include intercepting, by a minifilter, the modify request.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
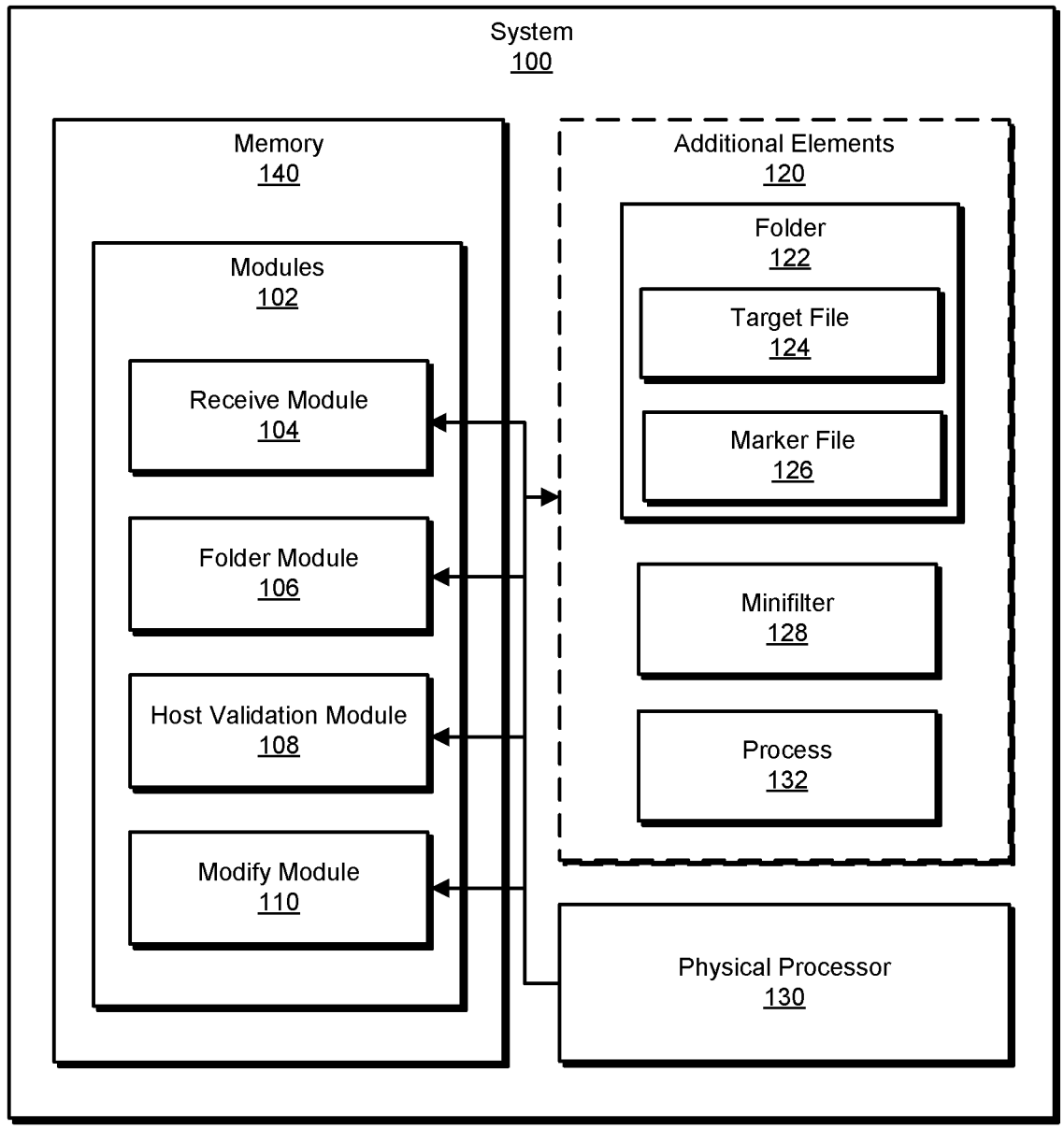
FIG. 1 is a block diagram of an example system for protecting a folder from unauthorized file modification.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting a folder from unauthorized file modification. As will be explained in greater detail below, by intercepting a modify request for a target file in a folder, identifying the folder as a protected folder, authenticating the remote device making the modify request as a trusted host, and allowing the modify request from the trusted host, the various systems and methods describe herein may be able to restrict malware from unauthorized modifications of files in a shared folder while allowing legitimate processes to modify the files. By intercepting modify requests from remote devices, the various systems and methods described herein may potentially alleviate bandwidth consumption by simplifying authentication of legitimate processes. Alternatively or additionally, the systems and methods may facilitate identification of protected folders accessed over a network.

Moreover, the systems and methods described herein may improve the functioning and/or performance of a networked computer by efficiently authenticating modify requests on protected folders without increasing overhead. These systems and methods may also improve the field of network security and/or backup systems by providing protection for backup images.

Figure 2:
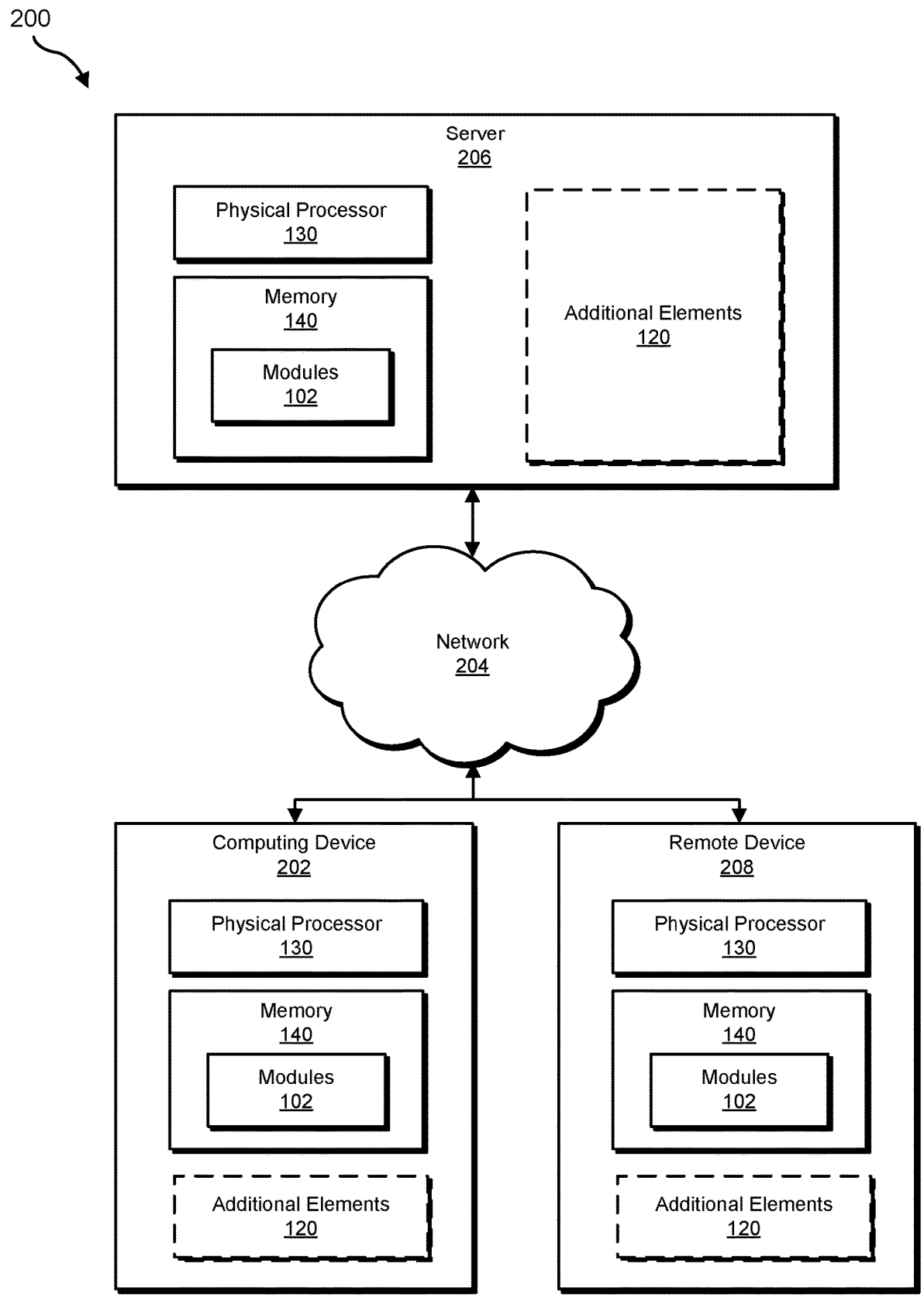
FIG. 2 is a block diagram of an additional example system for protecting a folder from unauthorized file modification.

The following will provide, with reference to FIGS. 1-2, detailed descriptions of example systems for protecting a folder from unauthorized file modification. Detailed descriptions of corresponding computer-implemented methods will also be provided in connection with FIG. 3. In addition, detailed descriptions of example minifilters and folders will be provided in connection with FIGS. 4 and 5.

FIG. 1 is a block diagram of an example system 100 for protecting a folder from unauthorized file modification. As illustrated in this figure, example system 100 may include one or more modules 102 for performing one or more tasks. As will be explained in greater detail below, modules 102 may include a receive module 104, a folder module 106, a host validation module 108, and a modify module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, remote device 208, and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting a folder from unauthorized file modification. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as folder 122, target file 124, marker file 126, minifilter 128, and process 132. Folder 122 may be a shared folder that may be locally accessed and remotely accessed. Target file 124 may be a file in folder 122 that may be subject to being remotely accessed. Target file 124 may be, for instance, a backup image file or any other type of data file. Marker file 126 may be an indicator that folder 122 may be a protected folder, as will be described further below. Minifilter 128 may be a kernel mode filter for filtering file system operations, as will be described further below. Process 132 may be a process, such as a backup application, that may access folder 122 and/or target file 124.

Example system 100 in FIG. 1 may be implemented in a variety of ways. For example, all or a portion of example system 100 may represent portions of example system 200 in FIG. 2. As shown in FIG. 2, system 200 may include a computing device 202 and a remote device 208 in communication with a server 206 via a network 204. In one example, all or a portion of the functionality of modules 102 may be performed by computing device 202, remote device 208, server 206, and/or any other suitable computing system. As will be described in greater detail below, one or more of modules 102 from FIG. 1 may, when executed by at least one processor of computing device 202, remote device 208, and/or server 206, enable computing device 202, remote device 208, and/or server 206 to protect a folder from unauthorized file modification.

Computing device 202 generally represents any type or form of computing device capable of reading computer-executable instructions. Computing device 202 may be, for example, an endpoint device running client-side backup software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Remote device 208 generally represents any type or form of computing device capable of reading computer-executable instructions. Remote device 208 may be, for example, an admin device for maintaining endpoint devices. Additional examples of remote device 208 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of managing security permissions. For example, server 206 may be a lockdown server or centralized admin server. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202, remote device 208, and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
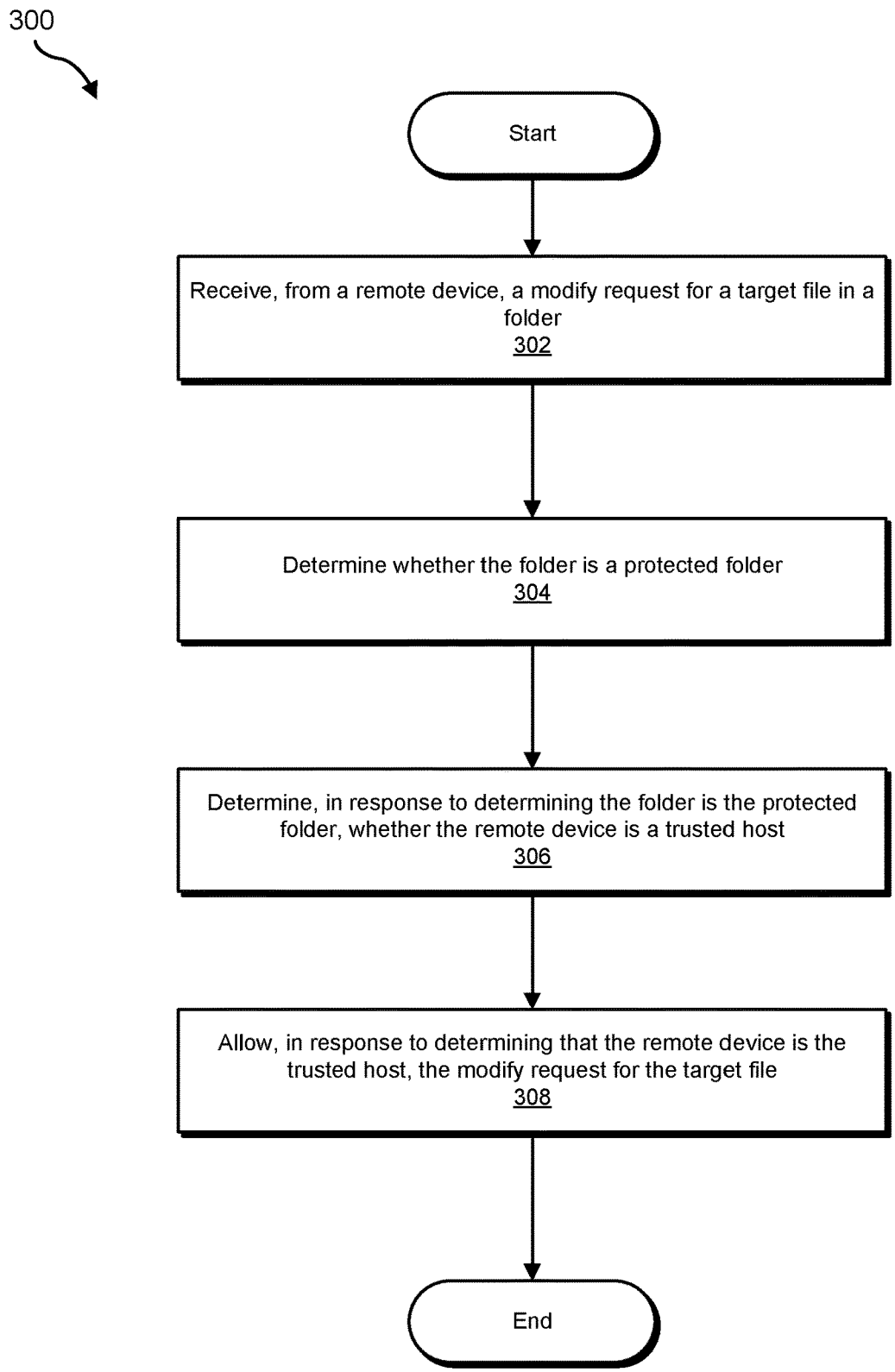
FIG. 3 is a flow diagram of an example method for protecting a folder from unauthorized file modification.

FIG. 3 is a flow diagram of an example computer-implemented method 300 for protecting a folder from unauthorized file modification. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive, from a remote device, a modify request for a target file in a folder. For example, receive module 104 may, as part of computing device 202 in FIG. 2, receive, from remote device 208, a modify request for target file 124 in folder 122.

The term "modify request," as used herein, generally refers to a request to perform an operation on a specified file. Examples of modify requests include, without limitation, write operations for changing data of the specified file, move operations for moving the specified file to a different folder, rename operations for changing a name and/or path of the specified file, compression operations for compressing the specified file, encryptions operations for encrypting the specified file, and other operations for changing the specified file, its attributes, its metadata, etc.

The systems described herein may perform step 302 in a variety of ways. In one example, receiving the modify request may include intercepting, by minifilter 128, the modify request.

Figure 4:
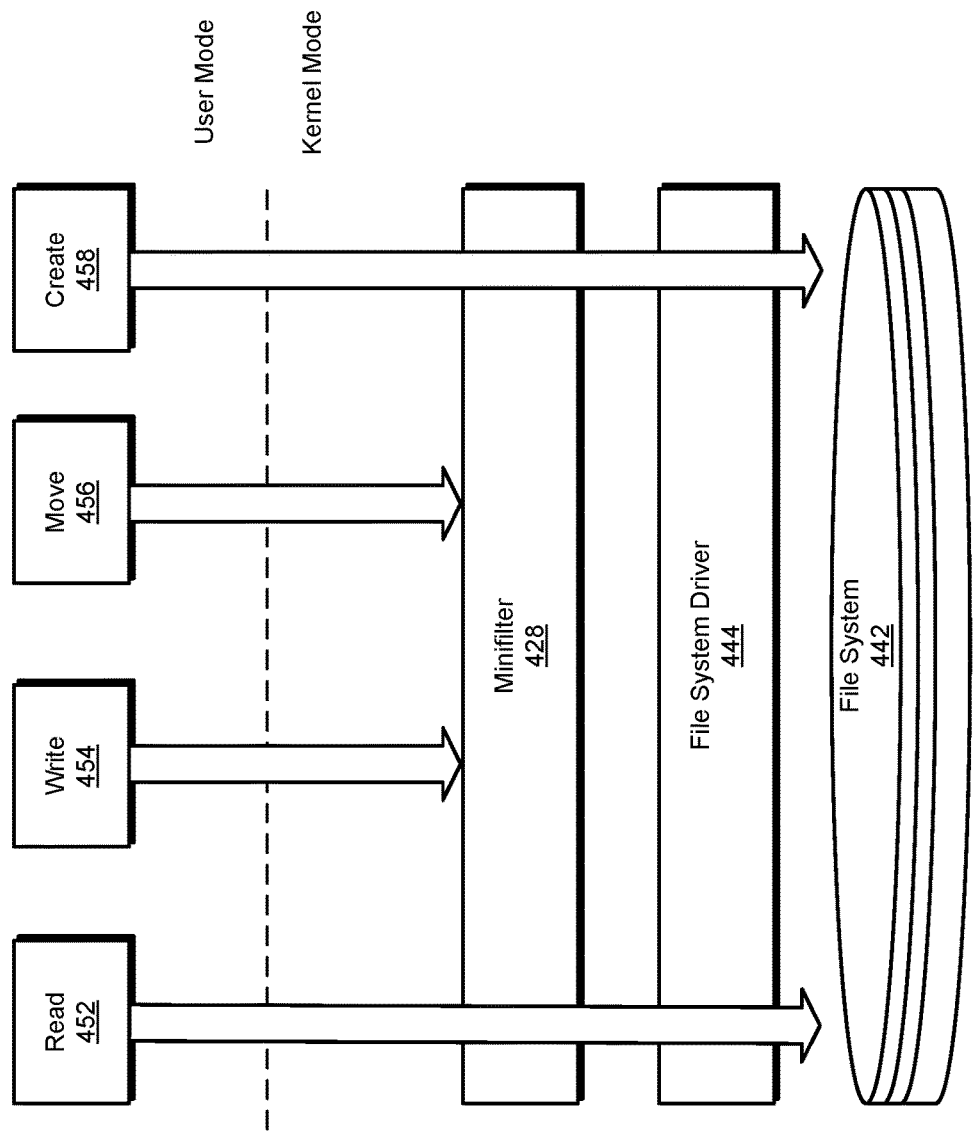
FIG. 4 is a block diagram of an example minifilter for protecting a folder from unauthorized file modification.

The term "minifilter," as used herein, generally refers to a filter for a file system of an operating system which may intercept input/output (I/O) requests for the file system before the I/O requests reach the file system. Examples of minifilters include, without limitation, any kernel mode filter on top of a file system, such as may be available with operating systems. FIG. 4 illustrates an example minifilter 428, which may correspond to minifilter 128.

FIG. 4 illustrates an operating environment 400 for a file system 442 and includes a file system driver 444 and minifilter 428. File system 442 may include a file system for organizing and managing files stored in a memory or storage device, such as memory 140. File system driver 444 may provide software support for accessing file system 442 and may support user mode operations including a read 452, a write 454, a move 456, and a create 458.

As seen in FIG. 4, minifilter 428 may intercept certain operations and may allow (e.g., ignore) certain other operations. In FIG. 4, minifilter 428 may intercept write 454 and move 456, but may automatically permit read 452 and create 458. In some implementations, minifilter 428 may intercept all operations of certain types (e.g., all write and move operations) and ignore operations of other certain types (e.g., all read and create operations). Although not illustrated in FIG. 4, in other implementations, additional minifilters may further filter operations such that a given operation may be filtered through various minifilters before reaching file system 442. Once minifilter 428 intercepts an operation, minifilter 428 may perform additional processing before permitting or denying the operation, as will be described further below.

Turning back to step 302, minifilter 128, which may be a part of or operate in conjunction with receive module 104, may intercept the modify request at the target device, e.g., computing device 202, after receive module 104 receives the modify request from remote device 208. For instance, minifilter 128 may intercept the modify request, from process 132 of remote device 208, for modifying target file 124 in folder 122 of computing device 202. Minifilter 128 may be configured to intercept any modify request for further processing before permitting the modify request.

In some implementations, remote device 208, may include its own minifilter 128 for intercepting the modify request before remote device 208 sends the modify request to computing device 202. In such implementations, minifilter 128 of remote device 208 may detect the modify request from process 132 on remote device 208 for modifying target file 124 in folder 122 of computing device 202. Minifilter 128 of remote device 208 may determine, using determination factors similar to those described below with respect to step 304, to determine whether target file 124 is in a protected folder. In some implementations, if folder 122 is not a protected folder, minifilter 128 may permit the modify request to be sent.

Minifilter 128 may, in response to determining that target file 124 is in a protected folder (e.g. that folder 122 is a protected folder), determine whether process 132 of remote device 208 (e.g., the process making the modify request) is an authorized process. For example, minifilter 128 may check a digital signature of process 132 or may otherwise identify process 132 (e.g., detecting a process ID). Minifilter 128 may communicate with a lockdown server, such as server 206, to authorize process 132 (e.g., to verify the digital signature of process 132). In other implementations, minifilter 128 may authorize process 132 based on a whitelist, or other authentication methods. Once minifilter 128 authorizes process 132, minifilter 128 may remember process 132, for instance by its process ID, in order to facilitate authorization of process 132 for subsequent modify requests. In such implementations, receive module 104 or another module 102 may track process creation and termination such that expired process IDs (e.g., process IDs corresponding to terminated processes) may be invalidated to no longer authorize the corresponding terminated process. For example, if process 132 terminates, minifilter 128 may no longer authorize the corresponding process ID. If a new instance of process 132 is created, minifilter 128 may re-authorized the new instance of process 132.

Minifilter 128 may, in response to determining that process 132 is an authorized process, send the modify request to computing device 202. If process 132 is not authorized, minifilter 128 may block the modify request from being sent, e.g., by discarding the modify request. In some implementations, the modify request may also include an identifier, such as a network address, for identifying remote device 208 making the modify request.

As illustrated in FIG. 3, at step 304 one or more of the systems described herein may determine whether the folder is a protected folder. For example, folder module 106 may, as part of computing device 202 in FIG. 2, determine whether folder 122 is a protected folder.

The term "protected folder," as used herein, generally refers to a folder (e.g., a directory, path, respository, etc.) having files. The access to the files in the protected folder may be restricted to authorized processes and/or trusted hosts.

The systems described herein may perform step 304 in a variety of ways. In one example, folder module 106 may access a list or table that enumerates protected folders on computing device 202. For example, minifilter 128 may maintain, for instance in a local memory, a list of protected folders and recognize folder 122 in the list. However, due to variability in path names in network environments, such a list may not reliably identify protected folders, particularly when accessed by remote devices such as remote device 208.

In some examples, minifilter 128, as part of folder module 106, may identify folder 122 as a protected folder based on whether folder 122 includes a marker file, such as marker file 126. Minifilter 128 may allow read requests on folder 122 such that remote device 208 may read the contents of folder 122 and identify folder 122 as a protected folder based on the presence of marker file 126. Thus, remote device 208 may reliably identify folder 122 as a protected folder despite any variation to a pathname for folder 122.

Figure 5:
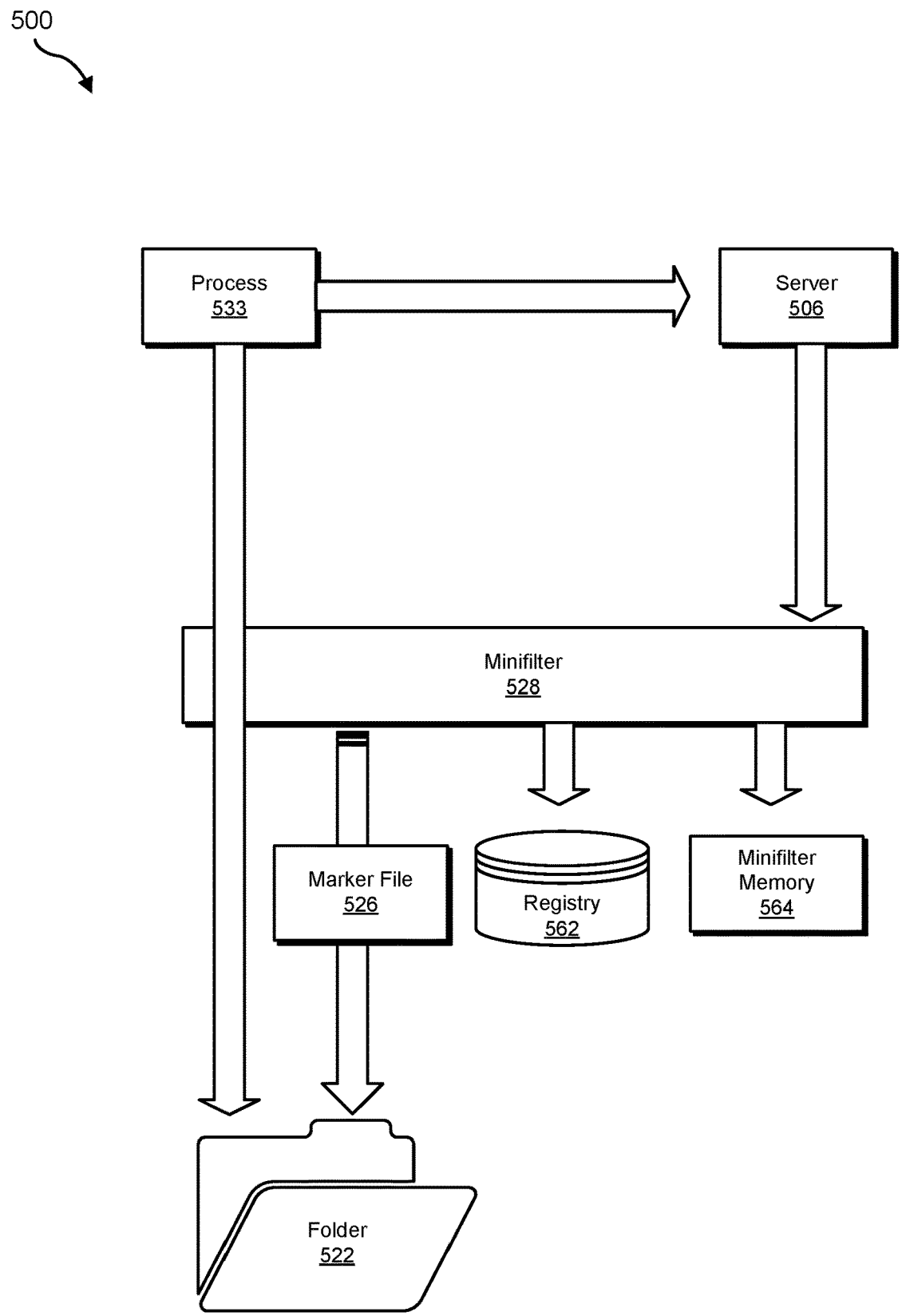
FIG. 5 is a dataflow diagram of creating a new folder to be protected.

FIG. 5 illustrates an environment 500 for creating a new protected folder. A process 533, which may correspond to process 132, may create a new protected folder. Process 533 may be, for example, a backup application for backing up data, a security application, or other administrative application that may create a protected folder for protecting files therein from unauthorized changes. Process 533 may create a folder 522, which may correspond to folder 122. Process 533 may also communicate with a server 506, which may correspond to server 206. Server 506 may be a security server, such as a lockdown server, a centralized admin server, or other server which may manage security software. Process 533 may notify server 506 that folder 522 is a protected folder.

In response to being notified by process 533, server 506 may communicate a minifilter 528, which may correspond to minifilter 128. Minifilter 528 may be a minifilter configured on a file system hosting folder 522. Minifilter 528 may add folder 522 to a registry 562 and a minifilter memory 564. Registry 562 may be a persistent storage for storing a list of protected folders within a purview of minifilter 528. Minifilter memory 564 may be a kernel memory for holding the list of protected folders during a runtime of minifilter 528. In some implementations, minifilter memory 564 may load the list of protected folders from registry 562 when minifilter 528 initializes.

Minifilter 528 may further add a marker file 526 to folder 522. The inclusion of marker file 526 in folder 522 may indicate that folder 522 is a protected file such that marker file 526 itself may not need to contain data. In some implementations, marker file 526 may contain data, such as metadata regarding folder 522.

Returning to FIG. 3, at step 306 one or more of the systems described herein may determine, in response to determining the folder is the protected folder, whether the remote device is a trusted host. For example, host validation module 108 may, as part of computing device 202 in FIG. 2, determine, in response to determining the folder is the protected folder, whether remote device 208 is a trusted host.

The term "trusted host," as used herein, generally refers to a computing device that may be authorized or otherwise validated. Trusted hosts may be authenticated in various ways, including via identification and whitelists, passwords, keys or tokens, etc.

The systems described herein may perform step 306 in a variety of ways. In one example, the modify request may include an identifier, such as a network address or other identifier, of remote device 208. Minifilter 128, which may be part of host validation module 108, may query server 206 with the identifier. Server 206, which may be a lockdown server or other security server, may authenticate remote device 208 as a trusted host based on the identifier.

In other examples, host validation module 108 and/or minifilter 128 may use an in-band protocol to confirm whether remote device 208 is the trusted host. For instance, the modify request may include a filename of target file 124. This filename may include a hash of a dynamic secret or other key maintained by server 206. Host validation module 108 may confirm the hash with server 206 or may otherwise recognize the hash. The inclusion of the hash may establish that remote device 208 is a trusted host, as server 206 may share such hash with trusted hosts. Host validation module 108 may then strip the hash from the filename in order to identify target file 124.

In yet other examples, host validation module 108 may confirm, by contacting remote device 208, the modify request. For instance, minifilter 128 of computing device 202 may communicate with minifilter 128 of remote device 208 to confirm whether remote device 208 is the trusted host. Additionally or alternatively, host validation module 108 may request or otherwise notify server 206 to communicate with remote device 208 in order to confirm that remote device 208 sent the modify request. As described above, minifilter 128 of remote device 208 may initially intercept the modify request originating from remote device 208 and may be able to acknowledge, to minifilter 128 of computing device 202 and/or server 206, that the modify request is from remote device 208.

At step 308 one or more of the systems described herein may allow, in response to determining that the remote device is the trusted host, the modify request for the target file. For example, modify module 110 may, as part of computing device 202 in FIG. 2, allow, in response to determining that remote device 208 is the trusted host, the modify request for target file 124.

The systems described herein may perform step 308 in a variety of ways. In one example, minifilter 128 may allow the modify request such that target file 124 may be modified according to the modify request.

As explained above in connection with FIGS. 1-5, a backup application may use a disk as primary storage for storing backup images in a local disk folder of a local machine. The local disk folder may be shared for network access such that backup services running on various admin servers may cooperate to create and/or update backup images in the shared folder. The shared folder may include a marker file to indicate that the shared folder is a protected network folder.

In one example, a backup process on an admin server may attempt to update a backup image in the shared folder. A minifilter on the admin server may recognize, due to the presence of the marker file, that the shared folder is a protected network folder. The minifilter may then authenticate the process, and once the process is authenticated, send the update attempt to the local machine. A local minifilter on the local machine may intercept the update attempt, recognize the folder as a protected folder, authenticate the admin server, and once authenticated, allow the update attempt to proceed.

In another example, an editing process on the admin server may attempt to update the backup image in the shared folder. The minifilter on the admin server may recognize, due to the presence of the marker file, that the shared folder is a protected network folder. The minifilter may attempt to authenticate the editing process. However, the editing process may not be authorized to modify the backup image, and the minifilter may deny the update such that the update request is not sent to the local machine.

In yet another example, the local machine may receive an update request for the backup image in the shared folder from a remote machine. The remote machine may not have a minifilter configured to authenticate an originating process of the update request such that the update request is sent. The local minifilter may recognize that the shared folder is a protected folder, and determine that the update request was not sent from a trusted host, ultimately denying the update request.

Thus, by utilizing a minifilter in the remote machine and/or the local machine, the systems and methods described herein may protect files in a shared folder. An update request may be denied at the remote machine and/or the local machine. In addition, using a marker file may facilitate remote minifilters identifying protected folders. Although the present disclosure describes protecting shared folders for backup software, the inventive concepts described herein may be used with other software requiring data protection, including archival software, replication software, security software, admin software, databases, etc.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting a folder from unauthorized file modification, the method being performed by a computing device comprising at least one processor, the method comprising:
   receiving, by a minifilter of the computing device from an authorized process on a remote device, a modify request for a target file in a local folder, wherein the modify request includes a filename for the target file, the filename includes a hash that corresponds to a key maintained by a lockdown server, the modify request is intercepted by a minifilter of the remote device, and the authorized process is authorized by the lockdown server through the minifilter of the remote device;
   detecting, locally by the computing device, a marker file in the local folder;
   determining, locally by the computing device in response to detecting the marker file, that the local folder is tho a protected folder;
   determining, by the computing device, in response to determining the local folder is the protected folder and based at least on the hash in the filename being confirmed with the lockdown server, whether the remote device is a trusted host;
   removing, in response to determining that the remote device is the trusted host, the hash from the filename to locally identify the target file; and allowing, by the computing device in response to determining that the remote device is the trusted host, the modify request for the target file.

2. The method of claim 1, wherein the modify request includes a network address of the remote device for identifying the remote device and determining whether the remote device is the trusted host is based on the network address.

3. The method of claim 1, wherein receiving the modify request further comprises intercepting, by the minifilter of the computing device, the modify request.

4. The method of claim 3, wherein the minifilter communicates with the lockdown server to determine whether the remote device is the trusted host.

5. The method of claim 1, wherein determining whether the remote device is the trusted host further comprises confirming, by contacting the remote device, the modify request.

6. The method of claim 1, wherein determining whether the remote device is the trusted device comprises acknowledging, by the minifilter of the remote device to the minifilter of the computing device, that the modify request is from the remote device.

7. The method of claim 1, further comprising, before receiving, by the computing device from the process on the remote device, the modify request:
detecting, by the minifilter of the remote device, the modify request for the target file in the local folder of the computing device from the process on the remote device;
detecting, by the remote device by accessing the computing device, a marker file in the local folder of the computing device;
determining, by the remote device in response to detecting the marker file, that the target file is in a protected folder;
determining, by the remote device in response to determining that the target file is in the protected folder, that the process is an authorized process for accessing the target file in the local folder of the computing device; and
sending, by the remote device in response to determining that the process is the authorized process, the modify request to the computing device.

8. A system for protecting a folder from unauthorized file modification, the system comprising:
a receive module, stored in memory, for receiving, by a minifilter of the system from an authorized process on a remote device that the remote device has determined is authorized by a lockdown server to access a target file in a local folder of the system, a modify request for the target file in the local folder, wherein the modify request includes a filename for the target file, the filename includes a hash that corresponds to a key maintained by the lockdown server, and the modify request is intercepted by a minifilter of the remote device to authorize the authorized process;
a folder module, stored in the memory, for determining locally that the local folder is the protected folder by detecting a marker file in the local folder;
a host validation module, stored in the memory, for determining, in response to determining the local folder is the protected folder and based at least on the hash in the filename being confirmed with the lockdown server, whether the remote device is a trusted host and in response to determining that the remote device is the trusted host, remove the hash from the filename to locally identify the target file;
a modify module, stored in the memory, for allowing, in response to determining that the remote device is the trusted host, the modify request for the target file; and
at least one physical processor that executes the receive module, the folder module, the host validation module, and the modify module.

9. The system of claim 8, wherein the modify request includes a network address of the remote device to identify the remote device and determining whether the remote device is the trusted host is based on the network address.

10. The system of claim 8,
wherein receiving the modify request further comprises intercepting, by the minifilter of the system, the modify request.

11. The system of claim 10, wherein the minifilter communicates with a lockdown server to determine whether the remote device is the trusted host.

12. The system of claim 8, wherein the host validation module is configured to determine whether the remote device is the trusted device by acknowledging, by the minifilter of the remote device to the minifilter of the system, that the modify request is from the remote device.

13. The system of claim 8, wherein the remote device is configured to:
detect, by the minifilter of the remote device, the modify request for the target file in the protected folder from the process on the remote device;
detect, by the remote device by accessing the system, a marker file in the local folder of the system;
determine, by the remote device in response to detecting the marker file, that the target file is in the protected folder;
determine, by the remote device in response to determining that the target file is in the protected folder, that the process is an authorized process for accessing the target file in the local folder of the system; and
send, by the remote device in response to determining that the process is the authorized process, the modify request to the system.

14. A non-transitory computer-readable medium comprising one or more computer-executable instructions that, when executed by at least one processor of a computing system including a remote device and a computing device, cause the computing system to:
receive, by a minifilter of the computing device from an authorized process on the remote device, a modify request for a target file in a local folder of the computing device, wherein the modify request includes a filename for the target file, the filename includes a hash that corresponds to a key maintained by a lockdown server, the modify request is intercepted by a minifilter of the remote device, and the authorized process is authorized by the lockdown server through the minifilter of the remote device;
detect, locally by the computing device, a marker file in the local folder;
determine, locally by the computing device in response to detecting the marker file, that the local folder is a protected folder;
determine, by the computing device in response to determining the local folder is the protected folder and based at least on the hash in the filename being confirmed with the lockdown server, whether the remote device is a trusted host;
remove, in response to determining that the remote device is the trusted host, the hash from the filename to locally identify the target file; and allow, by the computing device in response to determining that the remote device is the trusted host, the modify request for the target file.

15. The non-transitory computer-readable medium of claim 14, wherein receiving the modify request further comprises intercepting, by the minifilter of the computing system, the modify request.

16. The non-transitory computer-readable medium of claim 14, further comprising instructions for:
   detecting, by the minifilter of the remote device before the computing device receives the modify request, the modify request for the target file in the local folder of the computing device from the process on the remote device;
   detecting, by the remote device by accessing the computing device, the marker file in the local folder of the computing device;
   determining, by the remote device in response to detecting the marker file, that the target file is in a protected folder;
   determining, by the remote device in response to determining that the target file is in the protected folder, that the process is an authorized process for accessing the target file in the local folder of the computing device; and
   sending, by the remote device in response to determining that the process is the authorized process, the modify request to the computing device.

* * * * *